(12) United States Patent
Ohmori

(10) Patent No.: US 7,085,569 B2
(45) Date of Patent: Aug. 1, 2006

(54) CELL SEARCH METHOD FOR USE IN A MOBILE RADIO TERMINAL ADAPTABLE TO AT LEAST TWO KINDS OF MOBILE TELEPHONE SYSTEMS

(75) Inventor: Yoshiaki Ohmori, Tokyo (JP)

(73) Assignee: NEC Corporation (JP)

( * ) Notice: Subject to any disclaimer, the term of this patent is extended or adjusted under 35 U.S.C. 154(b) by 64 days.

(21) Appl. No.: 10/729,031

(22) Filed: Dec. 4, 2003

(65) Prior Publication Data
US 2004/0192296 A1 Sep. 30, 2004

(30) Foreign Application Priority Data
Dec. 4, 2002 (JP) .............................. 2002-353036

(51) Int. Cl.
*H04Q 7/20* (2006.01)
(52) U.S. Cl. .................. 455/435.2; 455/566; 455/525; 455/226.1; 455/432.1; 455/432.2; 455/435.1; 455/435.3; 455/436; 455/437; 455/438; 455/439; 455/442; 455/443; 370/335; 370/350
(58) Field of Classification Search ................ 455/566, 455/525, 226.1, 432.1, 432.2, 435.1, 435.2, 455/435.3, 436, 432, 438, 439, 442, 443; 370/335, 350
See application file for complete search history.

(56) References Cited
U.S. PATENT DOCUMENTS
5,991,644 A * 11/1999 Ogawa ......................... 455/566
6,195,532 B1 2/2001 Bamburak et al.
6,487,399 B1 * 11/2002 Rajaniemi et al. ....... 455/226.1
2002/0041580 A1 * 4/2002 Shoji et al. ................. 370/335
2003/0117996 A1 * 6/2003 Lim et al. .................... 370/350

FOREIGN PATENT DOCUMENTS
| EP | 0 724 371 A1 | 7/1996 |
| EP | 0 980 190 A1 | 2/2000 |
| EP | 1 244 275 A1 | 9/2002 |
| JP | 2001-145162 | 5/2001 |

(Continued)

OTHER PUBLICATIONS
Search Report from European Patent Office dated Mar. 29, 2004 issued in connection with corresponding European application No. 03 027 848.5.

(Continued)

Primary Examiner—Joseph Feild
Assistant Examiner—David Q. Nguyen
(74) Attorney, Agent, or Firm—Ostrolenk, Faber, Gerb & Soffen, LLP

(57) ABSTRACT

A mobile radio terminal 10 is adaptable to two kinds of mobile telephone systems A and B given priorities as A>B. When the mobile radio terminal (10) is located at a position M1, location registration is carried out between the mobile radio terminal (10) and the system B and the mobile radio terminal (10) is in a standby state in the system B. When the mobile radio terminal (10) moves to another position M2 and detects a cell of the system A by cell search (periodic) for the system A, location registration is carried out between the mobile radio terminal (10) and the system A and the mobile radio terminal (10) is turned into a standby state in the system A. If a user executes a "transmission-related operation", cell search is immediately carried out to put the mobile radio terminal (10) into the standby state in the system A.

14 Claims, 6 Drawing Sheets

FOREIGN PATENT DOCUMENTS

WO     WO 01/58190 A1     8/2001

OTHER PUBLICATIONS

Global System for Mobile Communications Technical Specification 3GPP TS 22.011 V5.1.0 (Sep. 2002) *3rd Generation Partnership Project; Technical Specification Group Services and System Aspects; Service Accessibility* (Release 5)—XP-002273600.

English translation of Abstract for Japanese Patent Application No. 2001-145162 dated May 25, 2001.

* cited by examiner

CELL SEARCH METHOD FOR USE IN A MOBILE RADIO TERMINAL ADAPTABLE TO AT LEAST TWO KINDS OF MOBILE TELEPHONE SYSTEMS

This application claims priority to prior Japanese application JP 2002-353036, the disclosure of which is incorporated herein by reference.

BACKGROUND OF THE INVENTION

This invention relates to a mobile radio terminal, such as a mobile telephone, adaptable to at least two kinds of mobile telephone systems, such as a GSM (Global System for Mobile communication) (2G) and a third-generation mobile telephone system (3G) and, in particular, to a cell search method for at least two kinds of mobile telephone systems.

When a mobile telephone is located outside a service zone of a mobile telephone system or at a time instant of power on, the mobile telephone is in a no-service mode in which location registration is not yet carried out between the mobile telephone and a base station and thus transmission and reception are unavailable. Therefore, the mobile telephone has a cell search function of periodically searching the base station for the purpose of location registration to the base station.

A cell search cycle has a large influence upon current consumption and user friendliness. Specifically, in order to reduce the current consumption, it is advantageous to lengthen the cell search cycle so that cell search is not so frequently carried out. However, if the cell search cycle is too long, the location registration may not be carried out for a long period of time even after entry into a cell zone. This is because the entry into the cell zone can not be recognized until the cell search is carried out. Thus, user friendliness is not good. On the other hand, if the cell search cycle is shortened, the location registration is carried out immediately after entry into the cell zone. Thus, the user friendliness is improved. However, power consumption required for the cell search is increased.

In view of the above, use has been made of a method of adjusting the cell search cycle depending upon the circumstance. For example, the cell search is carried out in a short cycle for a predetermined period of time after the mobile telephone moves out of the service zone and, in case where no cell (i.e., no base station) could be found for the predetermined period of time, the cell search cycle is lengthened stepwise.

For example, Japanese Patent Application Publication (JP-A) No. 2001-145162 proposes a method of the type mentioned above. Specifically, when the mobile telephone moves out of the service zone, the cell search cycle is lengthened in correspondence to a time duration for which the mobile telephone stays outside the service zone (i.e., the mobile telephone is kept in a no-service mode). When a user executes a predetermined operation (for example, presses down a search switch) outside the service zone, the cell search is immediately carried out. If the entry into the cell zone is detected as a result of the cell search, a service mode is immediately started and the location registration is carried out. If the mobile telephone is still located outside the service zone, the no-service mode is displayed and the cell search in a long cycle is carried out again.

Also in a mobile telephone (dual system mobile radio terminal) adaptable to two kinds of mobile telephone systems or networks (hereinafter referred to as mobile telephone systems) represented by 2G and 3G systems, a long cell search cycle is set for each of these systems in case where the mobile telephone is located outside service zones of both of the systems. For example, in a 2G standby state (2G_Idle period) where transmission and reception are available in the 2G system after the mobile telephone enters the service zone of the 2G system and location registration to the 2G system is completed, a cell search cycle in the 3G system is lengthened or the cell search itself is not carried out until a cell search switch is pressed.

Therefore, if the mobile telephone enters the service zone of the 3G system during the 2G_Idle period, the entry into the service zone of the 3G system can not immediately be detected unless the end of the cell search cycle for the 3G system is approaching or unless the cell search switch is pressed. Thus, transmission is often carried out using the 2G system for which the location registration is already completed. This results in a problem that the chances of utilizing the merits of the 3G system (speech quality, communication rate, and the like) are reduced.

SUMMARY OF THE INVENTION

It is therefore an object of this invention to provide, in a mobile telephone adaptable to at least two kinds of mobile telephone systems represented by 2G and 3G systems, means for automatically enabling call transmission in the 3G system even during a 2G_idle period if the mobile telephone is located within a service zone of the 3G system.

According to this invention, there is provided a cell search method for use in a mobile radio terminal adaptable to a predetermined number N of kinds of mobile telephone systems (A, B), where N is an integer not less than 1, the method comprising the steps of setting priorities for the mobile telephone systems, immediately carrying out cell search for a high-priority mobile telephone system when a user of the mobile radio terminal executes a transmission-related operation in case where location registration to a low-priority mobile telephone system has already been made, and carrying out, upon detecting a cell of the high-priority mobile telephone system, location registration for the high-priority mobile telephone system to put the mobile radio terminal into a standby state in the high-priority mobile telephone system.

For example, in a mobile radio terminal adaptable to mobile telephone systems in a GSM (Global System for Mobile communication) (2G) and a third-generation mobile telephone system (3G), the 3G system is given high priority. In this event, if a user carrying the mobile radio terminal executes a "transmission-related operation" (such as dialing, input of a mail address, and an unfolding operation in case of a folded-type mobile telephone), the cell search for the 3G system is immediately carried out even during a 2G_idle period. Upon detection of a 3G cell, a 3G standby state (location registration) is immediately started. If the user executes a transmission start operation (presses down a transmission button) thereafter, transmission and reception in the 3G system can be carried out.

Normally, a search cycle for the 3G system (hereinafter may briefly be called a 3G search cycle) is determined to be long in order to suppress power consumption. Only when the user initiates transmission, the 3G search cycle is shortened to raise the probability of detecting the 3G cell. Therefore, in case where the mobile radio terminal is present in a 3G service zone upon transmission even during the 2G_idle period, the probability of transition into the 3G standby state and transmission using the 3G system is increased. Thus, for the user, there is an advantage of an increased possibility of transmission using the 3G system. As described above, the cell search cycle is shortened by the "transmission-related operation" of the user as a trigger without requiring a special operation (for example, pressing down of a search switch). Therefore, the user can use this function without being conscious thereof.

In this invention, the respective mobile telephone systems are given priorities, for example, as 2G<3G. Only during the standby state in a low-priority system (2G), the above-mentioned processing of this invention is carried out. During the standby state in the 3G system as a high-priority system or when the mobile radio terminal is located outside service zones of both of the 2G and the 3G systems, the above-mentioned operation is not carried out. In this manner, it is possible to simultaneously achieve "reduction in power consumption" and "increase in probability of transmission in a high-priority system".

DESCRIPTION OF THE PREFERRED EMBODIMENT

Figure 1:
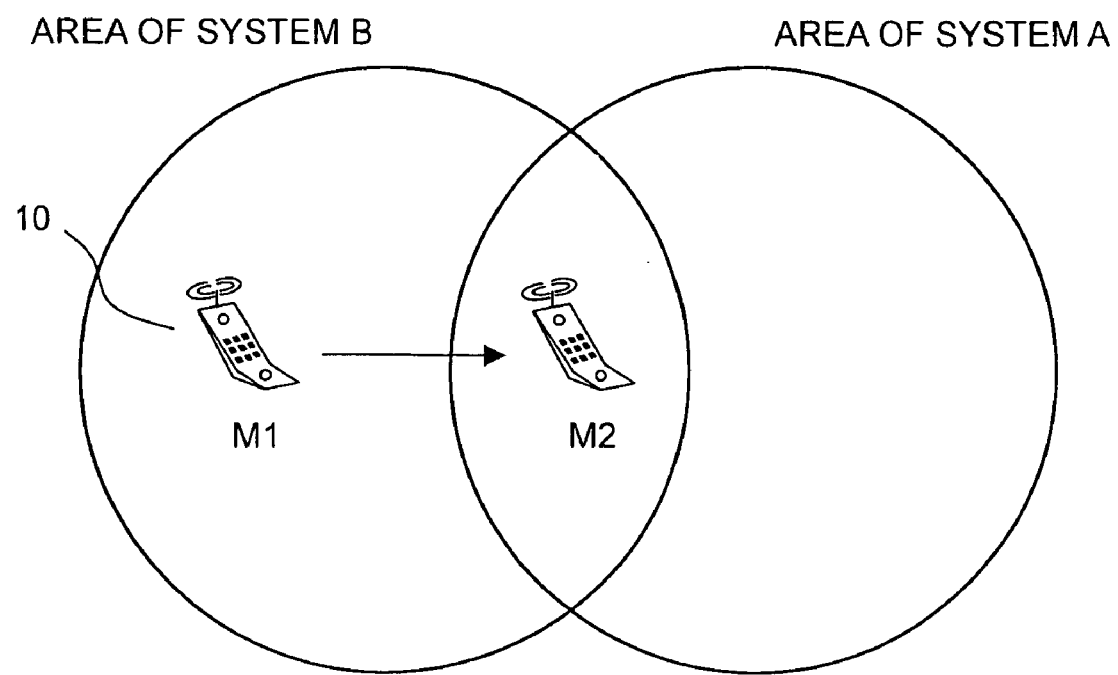
FIG. 1 shows two mobile radio systems to which this invention is applicable.

Now, description will be made of an embodiment of this invention with reference to the drawing.

Referring to FIG. 1, two kinds of mobile telephone systems (or two kinds of mobile telephone networks) A and B to which this invention is applicable have service areas at least partially overlapping each other. A mobile radio terminal 10 has a structure adaptable to the two mobile telephone systems A and B. It is assumed here that the systems A and B are given priorities of transmission as A>B.

When the mobile radio terminal 10 is located outside the service areas of the systems A and B, the mobile radio terminal 10 periodically carries out cell search for each of the systems A and B in a long cycle (for example, at intervals of 6 minutes). When the mobile radio terminal 10 is located at a position M1, location registration is carried out between the mobile radio terminal 10 and the mobile telephone system B so that the mobile radio terminal 10 is put into a standby state in the system B. Simultaneously, the mobile radio terminal 10 continuously periodically carries out the cell search for the system A in the long cycle (for example, at intervals of 6 minutes).

When the mobile radio terminal 10 moves from the position M1 to another position M2, a cell of the mobile telephone system A is detected by the cell search for the system A periodically carried out (for example, at intervals of 6 minutes). As a consequence, location registration is carried out between the mobile radio terminal 10 and the mobile telephone system A having a high priority so that the mobile radio terminal 10 is put into a standby state in the system A. Alternatively, if a user of the mobile radio terminal 10 executes a "transmission-related operation" before the location registration with the system A is carried out as a result of the cell search periodically carried out, the cell search for the system A is immediately and temporarily carried out. Then, location registration between the mobile radio terminal 10 and the system A is carried out and the mobile radio terminal 10 is turned into the standby state in the system A. Thus, transmission in the system A becomes available.

Figure 2:
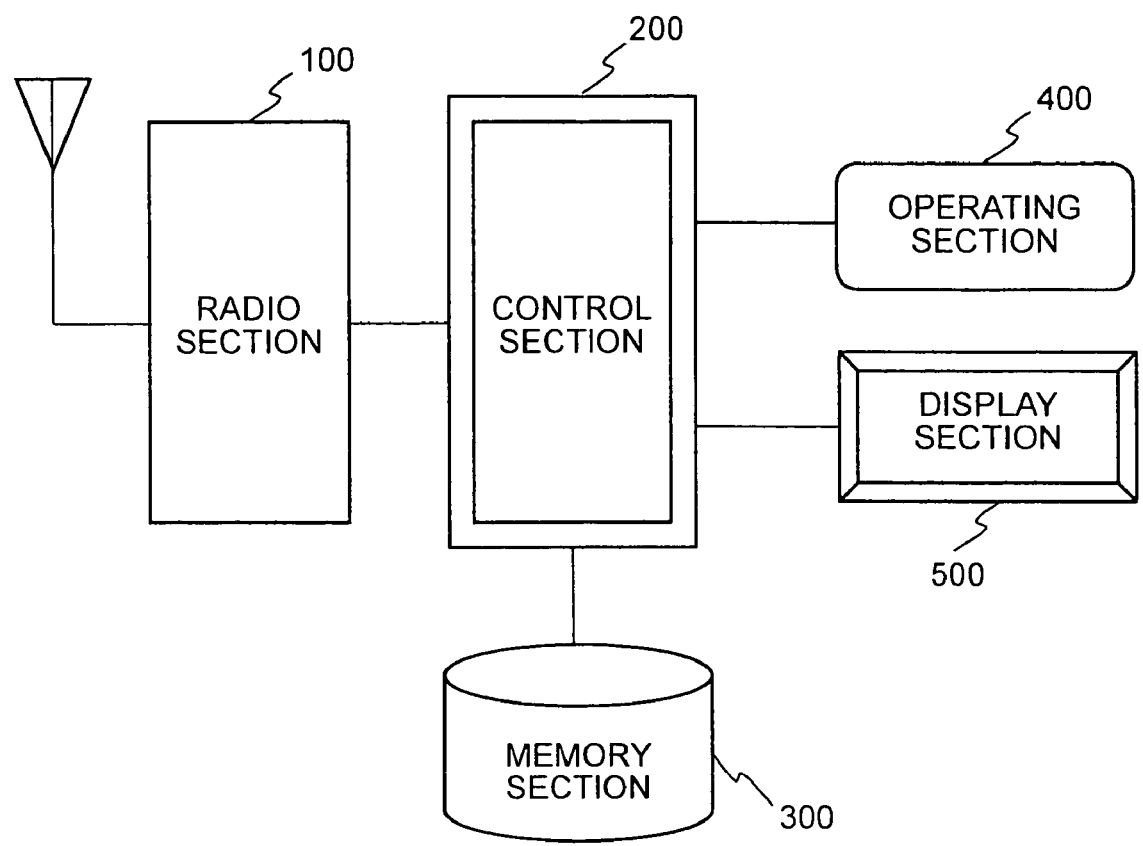
FIG. 2 is a schematic block diagram of a mobile radio terminal used in an embodiment of this invention.

Referring to FIG. 2, the mobile radio terminal 10 in this embodiment will be described. In the figure, only the components related to this invention are shown. For convenience of description, a mobile telephone adaptable to two kinds of radio systems including the systems A and B is assumed to be the mobile radio terminal 10 of this embodiment.

In FIG. 2, the mobile telephone as the mobile radio terminal 10 comprises a radio section 100 including an antenna and adaptable to both of the systems A and B, a system control section 200 adaptable to both of the systems A and B, a memory section 300, an operating section 400, and a display section 500. The operating section 400 includes an unfolding operation detecting function in case where the mobile telephone is of a folded type. The control section 200 controls operations of the mobile telephone in accordance with various control programs stored in the memory section 300.

In the mobile telephone of this invention, the respective systems are preliminarily given priorities for the cell search. The priorities are stored in the memory section 300. In accordance with the priorities, the cell search is carried out. The user may determine the priorities for the cell search with respect to the individual systems. In this event, setting is carried out, for example, in the following manner.

1. The user manipulates the operating section 400 to start a "system priority setting" operation.

2. The priorities of the systems as currently set are read from the memory section 300 and displayed on the display section 500.

<Example>
System A=1 (high priority)
System B=1 (high priority)

3. The user manipulates the operating section 400 to set new priorities of the systems.

<Example>
System A=1 (high priority)
System B=2 (low priority)

4. The user executes a setting completion operation at the operating section 400 so that the new priorities are memorized in the memory section 300.

Figure 3:
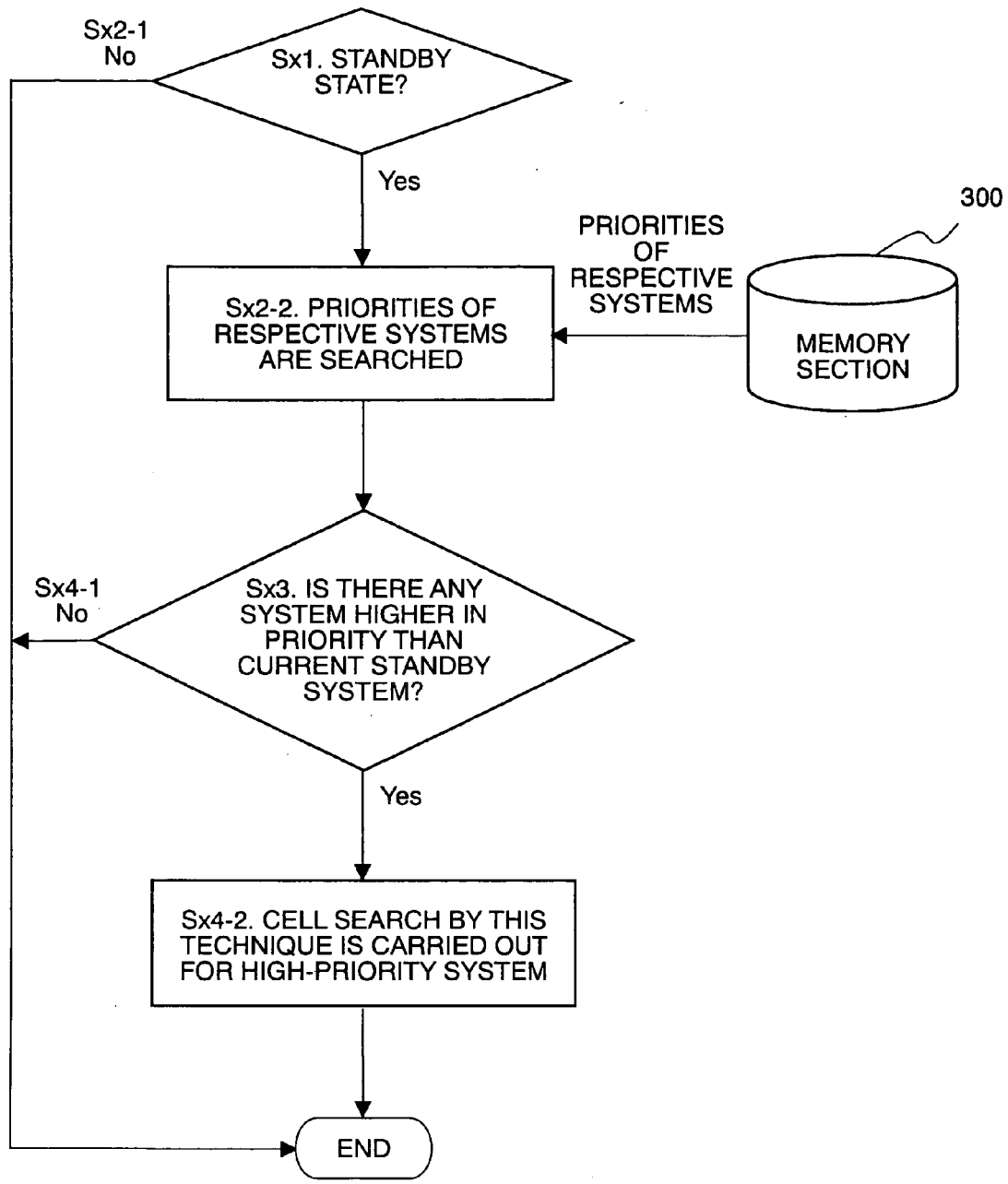
FIG. 3 is a flow chart for describing an operation of judging whether or not a priority-based cell search according to this invention is to be carried out.

Referring to FIG. 3, judgment is made about whether or not the mobile telephone should carry out the cell search depending upon the priorities. The control section 200 reads the "priorities of the systems memorized in the memory section 300" and judges "which system is a current standby system involved in the standby state". Based on such information, judgment is made about whether or not this technique is to be used.

It is assumed here that the priorities of the systems are set as follows.

System A=1 (high priority)
System B=2 (low priority)

It is also assumed that the mobile telephone is in a standby state in the system B.

Step Sx1 in FIG. 3: The control section 200 judges whether or not the mobile telephone is in a standby state.

Step Sx2-1 in FIG. 3: If the mobile telephone is not in the standby state, the cell search by this technique is not carried out.

Step Sx2-2 in FIG. 3: If the mobile telephone is in the standby state in one of the systems as the current standby system, the control section 200 searches the priorities of the systems as memorized in the memory section 300.

Step Sx3 in FIG. 3: Comparison is made between the priority of the current standby system (system B in this case) and the priority of the other system or systems (system A in this case).

Step Sx4-1 in FIG. 3: In absence of a system higher in priority than the current standby system, the cell search by this technique is not carried out.

Step Sx4-2 in FIG. 3: In presence of a system higher in priority than the current standby system, the control section 200 determines that the cell search by this technique is to be carried out for the system higher in priority. However, for the system same in priority as the current standby system, the cell search by this technique is not carried out. In the present description, the systems A and B are given priorities as A>B. Therefore, judgment is made that the cell search by this technique is to be carried out for the system A.

Figure 4:
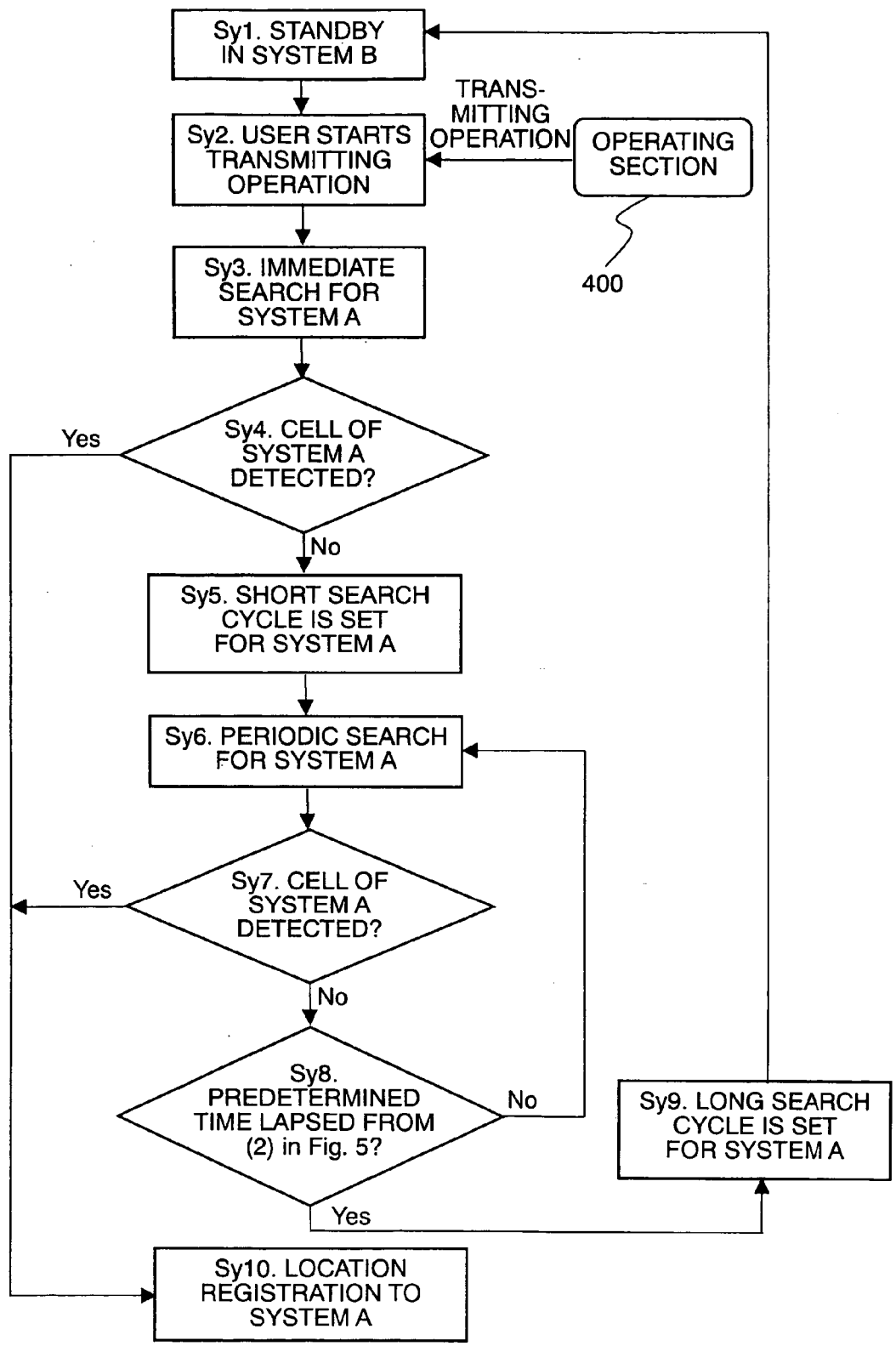
FIG. 4 is a flow chart for describing an operation of this invention when a transmission-related operation is detected in a standby state in a low-priority system.
Figure 5:
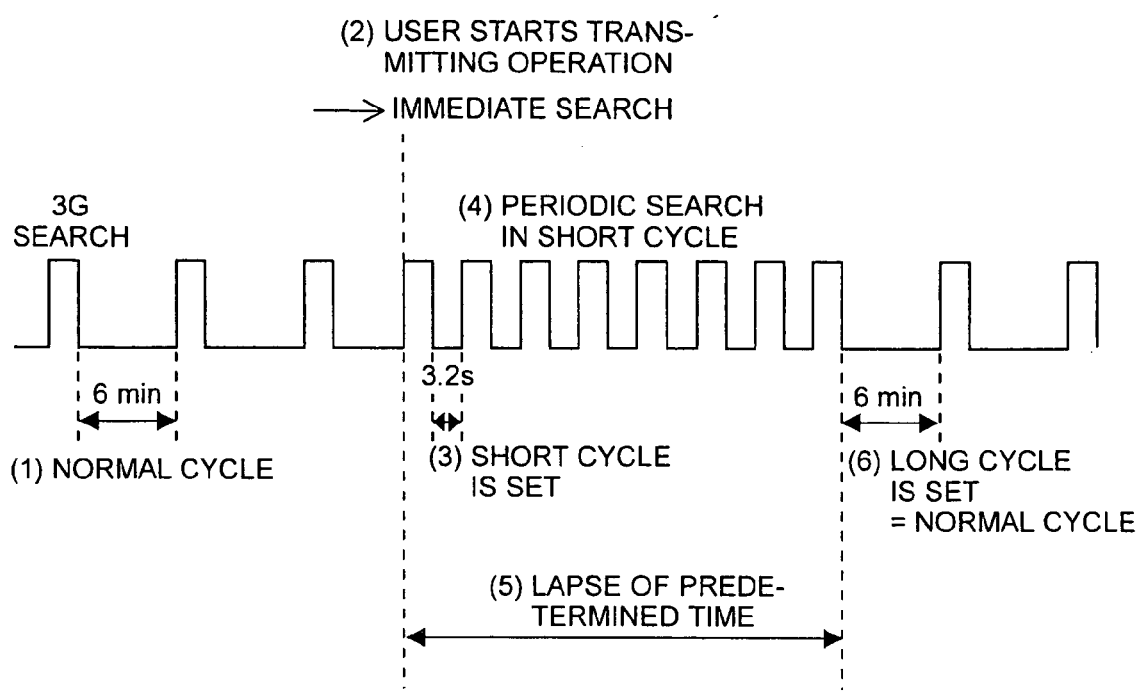
FIG. 5 is a time chart for describing an operation of changing a cell search cycle of a high-priority system.

Referring to FIG. 4, it is assumed that a "transmission-related operation" is detected when the mobile telephone is in a standby state in a low-priority system (system B) and when the cell search for a high-priority system (system A) is periodically carried out. In FIG. 5, the cell search cycle of the high-priority system (system A) is changed.

Referring to FIGS. 2 through 5, description will be made of the operation of this embodiment when the "transmission-related operation" is executed, assuming that judgment is made that the cell search by this technique is to be carried out for the system A.

Step Sy1 in FIG. 4: The mobile telephone is in a standby state in the system B and carries out the cell search for the system A in a normal cycle (for example, at intervals of 6 minutes) depicted at (1) in FIG. 5.

Step Sy2 in FIG. 4: The user starts a dialing operation or input of a mail address at the operating section 400 or, in case where the mobile telephone is of a folded type, the user unfolds a main body of the mobile telephone. Then, the control section 200 detects the "transmission-related operation".

Step Sy3 in FIG. 4: Upon detection of the "transmission-related operation", the control section 200 immediately carries out the cell search for the system A ((2) in FIG. 5) at the step Sy3.

Step Sy4 in FIG. 4: The control section 200 judges in the step Sy4 whether or not a cell of the system A has been found.

Step Sy5 in FIG. 4: If no cell of the system A has been found in the step Sy4, the control section 200 sets a short cycle (for example, intervals of 3.2 seconds) as the cell search cycle for the system A ((3) in FIG. 5).

Step Sy6 in FIG. 4: The control section 200 repeatedly carries out, in the step Sy6, the cell search for the system A in the short cycle set in the step Sy5 ((4) in FIG. 5).

Step Sy7 in FIG. 4: The control section 200 judges in the step Sy7 whether or not a cell of the system A has been found.

Step Sy8 in FIG. 4: If no cell of the system A has been found in the step Sy7, the control section 200 judges whether or not a predetermined period of time has lapsed from (2) in FIG. 5 in the step Sy2 ((5) in FIG. 5).

Step Sy9 in FIG. 4: If no cell of the system A has been found after lapse of the predetermined period of time, the control section 200 sets a normal long cycle (for example, intervals of 6 minutes) as the cell search cycle for the system A ((6) in FIG. 5) and the operation returns to the step Sy1.

Step Sy10 in FIG. 4: If a cell of the system A has been found in the step Sy4 or Sy7, the control section 200 starts location registration to the system A. If the location registration is successful, the mobile telephone is turned into a standby state in the system A.

It is noted here that the operation (for example, dial input) in the step Sy2 is an operation to be followed by transmission but a transmission button is not yet pressed actually.

Figure 6:
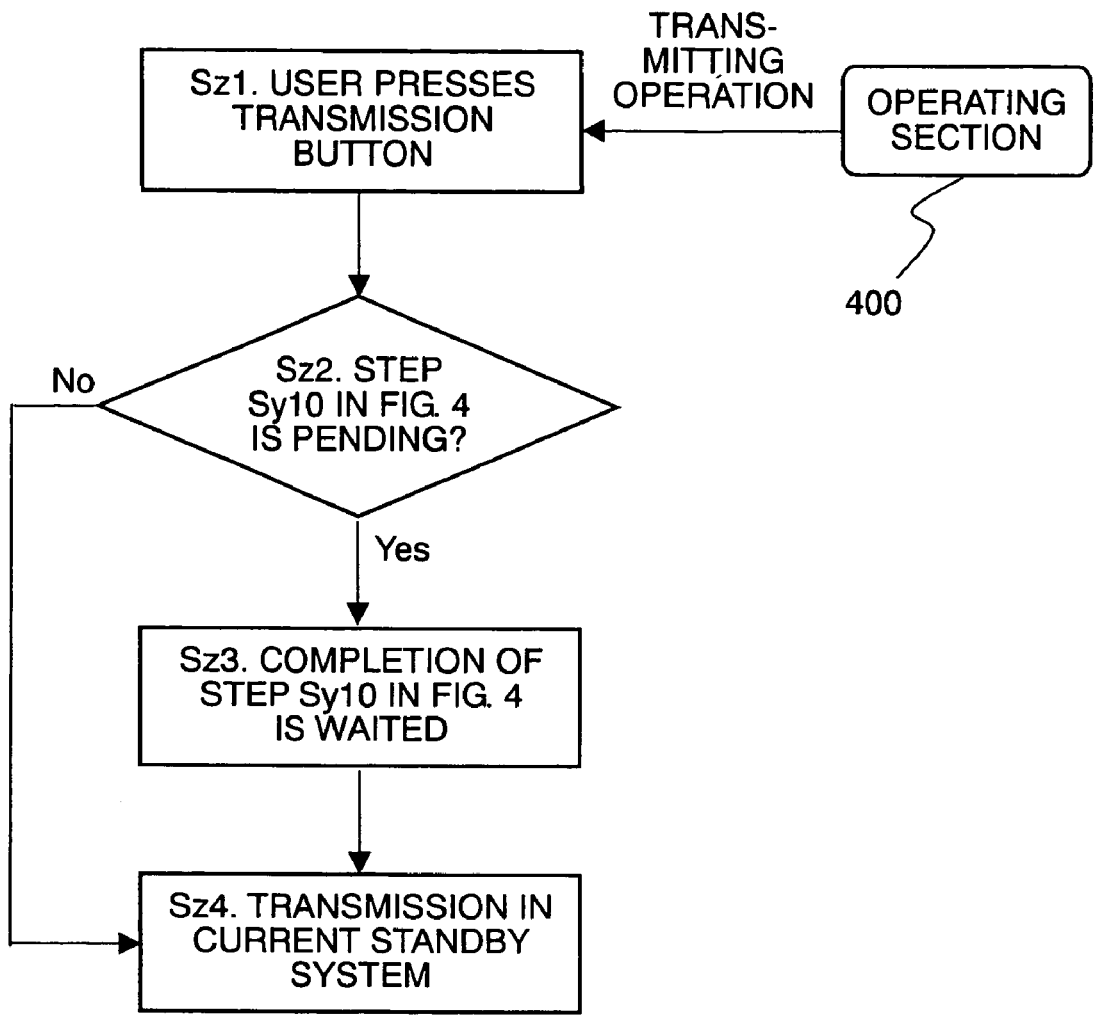
FIG. 6 is a flow chart for describing an operation upon transmission according to the embodiment.

Referring to FIG. 6 in addition to FIGS. 2 and 5, description will be made of the operation of this embodiment upon transmission.

Step Sz1 in FIG. 6: The user executes a transmission determining operation (typically, pressing down of the transmission button) at the operating section 400.

Step Sz2 in FIG. 6: The control section 200 judges whether or not the above-mentioned step Sy10 is pending.

Step Sz3 in FIG. 6: If the step Sy10 is pending, the control section 200 waits completion of the step Sy10.

Step Sz4 in FIG. 6: The control section 200 causes the performance of the transmission in the current standby system.

The operation in the step Sz1 is an operation of actually determining the transmission (pressing down of the transmission button).

In the foregoing embodiment, description has been made of the mobile telephone supporting the two kinds of systems including the system A and the system B. That is, description has been made of the mobile telephone supporting a predetermined number N of the systems in case where N is equal to 2. However, the predetermined number N of the systems may be supported in case where N is greater than 2. For example, in the mobile telephone supporting three systems A, B, and C, the respective systems can be given priorities as follows.

System A=1 (high priority)
System B=2 (medium priority)
System C=3 (low priority)
In this case:
In the standby state in the system A, this technique is not executed.
In the standby state in the system B, the cell search by this technique is executed only for the system A.
In the standby state in the system C, the cell search by this technique is executed for the systems A and B.

As a further example, it is possible to set the priorities as follows.
System A=1 (high priority)
System B=1 (high priority)
System C=2 (low priority)
In this case:
In the standby state in the system A or the system B, this technique is not executed.
In the standby system in the system C, the cell search by this technique is executed for the systems A and B.

The foregoing embodiment assumes the mobile telephone of a dual system. However, this invention is also applicable to a plurality of systems or networks in the 3G system. For example, the above-mentioned systems A and B are assumed as follows.

System A (high priority)=a network under a primary agreement (HPLMN: Home Public Land Mobile Network)

System B (low priority)=a network other than the HPLMN (for example, a network under a roaming agreement)

A 3G mobile telephone in a standby state in the network (system B) other than the HPLMN normally searches the HPLMN (system A) at long intervals corresponding to an integral multiple of 6 minutes.

By applying this technique to the mobile telephone of the above-mentioned type, it is possible to immediately search the HPLMN upon executing the "transmission-related operation" so that, if the mobile telephone is located in a HPLMN zone, a HPLMN cell is detected and switching into the HPLMN is carried out. Therefore, transmission is possible without using the network under the roaming agreement (i.e., by using the HPLMN).

In the description of the step Sz2 in the operation upon transmission (FIG. 6), whether or not the above-mentioned step Sy10 is pending is judged. However, without carrying out the judgment, the step Sz4 may immediately be executed. In this case, even if location registration to the system A is pending, a transmitting operation in the system B is immediately carried out and the location registration to the system A is interrupted.

In the description of steps Sy8 and Sy9 in the cell search cycle changing operation (FIG. 4), the "predetermined period of time" is mentioned. Instead of the predetermined period of time, a "predetermined number of times" may be used. In the description of the step Sy2, the "transmission-related operation" is mentioned. However, the operation in the step Sy2 need not be restricted to those related to the transmitting operation. The step Sy2 may be executed merely by manipulation of the operating section by the user.

The control section 200 for carrying out cell search for a high-priority mobile telephone system may further include a function for carrying out, in case where a cell of the high-priority mobile telephone system is not detected, transmission in the low-priority mobile telephone system to which the location registration has been made.

In the operation of setting the priorities of the respective systems (FIG. 3), it is possible to turn on or off the processing of this invention itself. The mobile telephone or the mobile radio terminal need not have the structure in FIG. 2. For example, a plurality of control sections 200 may be provided in one-to-one correspondence to the systems. Likewise, a plurality of radio sections 100 may be provided in one-to-one correspondence to the systems.

In case where the 3G system is given high priority, immediate 3G search is carried out and a short cycle is set as the 3G search cycle only when the user starts the "transmission-related operation" in the 2G standby state. Except for the above-mentioned situation, the 3G search is skipped or the 3G search cycle is lengthened. Therefore, power consumption can be saved.

When the user starts the "transmission-related operation" such as a dialing operation, an immediate 3G search is carried out and a short cycle is set as the 3G search cycle. This increases the probability of detecting a 3G cell at the time of actual transmission (at the time of pressing the transmission button). Thus, for the user, the chances of enjoying the merits of the 3G system (speech quality, communication rate, and so on) are increased.

For a predetermined period of time or a predetermined number of times of search after the user starts the "transmission-related operation", a short cycle is set as the search cycle. Therefore, as compared with a method of carrying out immediate and temporary search only once when the user executes a predetermined operation, detection of a 3G cell is highly probable even after the search has once failed. Thus, the chances of enjoying the merits of the 3G system (speech quality, communication rate, and so on) are further increased.

The user is not required to execute a special operation (for example, to press down a search switch) in order to switch the mobile communication systems from one to another. Thus, the user can use this function without being conscious thereof.

By judging execution of the "transmission-related operation" (for example, dialing operation, input of a mail address) by the user, the operation of selecting a high-priority system is executed. Therefore, in case of an operation unrelated to the transmission (for example, an operation of adjusting a clock), immediate and temporary cell search or shortening of a search cycle are not carried out. Thus, unnecessary power consumption is suppressed.

What is claimed is:

1. A cell search method for use in a mobile radio terminal adaptable to a predetermined number N of kinds of mobile telephone systems, where N is an integer not less than 1, the method comprising the steps of setting priorities for the mobile telephone systems, carrying out cell search for a high-priority mobile telephone system at first regular intervals when the mobile radio terminal is in a standby state in a low-priority mobile telephone system, immediately carrying out cell search for a high-priority mobile telephone system when a transmission-related operation is executed by the mobile radio terminal in case where location registration to a low-priority mobile telephone system has already been made, and, in a case where a cell of the high-priority mobile telephone system cannot be detected by the cell search for the high-priority mobile telephone system following the transmission-related operation, the cell search for the high-priority mobile telephone system is repeated at second regular intervals, and carrying out, upon detecting a cell of the high-priority mobile telephone system, location registration for the high-priority mobile telephone system to put the mobile radio terminal into a standby state in the high-priority mobile telephone system, each of the second regular intervals being of shorter time duration than each of the first regular intervals.

2. A cell search method as claimed in claim 1, wherein the transmission-related operation is a dial input operation or a mail address input operation.

3. A cell search method as claimed in claim 1, wherein said mobile radio terminal is a folded-type mobile telephone and the transmission-related operation is an operation of unfolding the folded-type mobile telephone.

4. A cell search method as claimed in claim 1, wherein, following the transmission-related operation, the cell search for the high-priority mobile telephone system is repeated at the second regular intervals for a predetermined period of time.

5. A cell search method as claimed in claim 1, wherein, following the transmission-related operation, the cell search for the high-priority mobile telephone system is repeated at the second regular intervals a predetermined number of times.

6. A cell search method as claimed in claim 1, wherein, in case where the cell of the high-priority mobile telephone system is detected but location registration thereto is not completed at the time instant of detection of a transmission start operation by a user, transmission is suspended until the location registration to the high-priority mobile telephone system is completed and the transmission is carried out immediately after completion of the location registration.

7. A cell search method as claimed in claim 1, wherein, in case where a cell of the high-priority mobile telephone system is not detected by the cell search for the high-priority mobile telephone system, transmission is carried out in the low-priority mobile telephone system to which the location registration has been made.

8. A cell search method as claimed in claim 1, wherein priorities of the mobile telephone system can be determined and the cell search is executed with reference to the priorities determined and the information of one of the mobile telephone systems as a current standby system in which the mobile radio terminal is currently in the standby state.

9. A mobile radio terminal adaptable to a predetermined number N of kinds of mobile telephone systems, where N is an integer not less than 1, said mobile radio terminal comprising means for setting priorities for the mobile telephone systems, means for carrying out cell search for a high-priority mobile telephone system: (1) at first regular intervals when the mobile radio terminal is in a standby state in a low-priority mobile telephone system, (2) upon detecting that the mobile radio terminal carries out a transmission-related operation in case where location registration to a low-priority mobile telephone system has been made, and (3) when a cell of the high-priority mobile telephone system cannot be detected by the cell search for the high-priority mobile telephone system following the transmission-related operation, the cell search for the high-priority mobile telephone system is repeated at second regular intervals, and means for carrying out location registration to the high-priority mobile telephone system to start a standby state in the high-priority mobile telephone system upon detection of a cell of the high-priority mobile telephone system by the cell search, each of the second regular intervals being of shorter time duration than each of the first regular intervals.

10. A mobile radio terminal as claimed in claim 9, wherein the means for carrying out cell search for a high-priority mobile telephone system has a function of repeating the cell search at the second regular intervals for a predetermined period of time.

11. A mobile radio terminal as claimed in claim 9, wherein the means for carrying out cell search for a high-priority mobile telephone system has a function of repeating the cell search at the second regular intervals a predetermined number of times.

12. A mobile radio terminal as claimed in claim 9, further comprising means or carrying out transmission after detection of a transmission start operation (pressing down of a transmission button) and completion of the location registration to the high-priority system.

13. A mobile radio terminal as claimed in claim 9, wherein the means for carrying out cell search for a high-priority mobile telephone system comprises means for carrying out, in case where a cell of the high-priority mobile telephone system is not detected, transmission in the low-priority mobile telephone system to which the location registration has been made.

14. A program stored in a computer-readable medium to control cell search in a mobile radio terminal adaptable to a predetermined number N of kinds of mobile telephone systems, where N is an integer not less than 1, said program causing said computer to execute the operations of:

judging whether or not said mobile radio terminal is in a standby state in one of the mobile telephone systems as a current standby system;

searching priorities of the mobile telephone systems to which said mobile radio terminal is adaptable;

detecting a transmitting operation of said mobile radio terminal;

requesting, in case where said mobile radio terminal is in the standby state and a high-priority mobile radio system higher in priority than the current standby system is present, cell search for the high-priority mobile telephone system immediately when the transmitting operation is detected;

requesting repetition of the cell search for the high-priority mobile telephone system in a short cycle for a predetermined period of time or a predetermined number of times in a case where a cell of the high-priority mobile telephone system is not detected in the cell search;

requesting completion of the cell search and location registration to the high-priority mobile telephone system if the cell of the high-priority mobile telephone system is detected; and requesting setting of a long cycle for the cell search for the high-priority mobile telephone system or stop of the cell search for the high-priority mobile telephone system and requesting recovery of the standby state in the low-priority mobile telephone system if the cell of the high-priority mobile telephone system is not detected in the cell search repeatedly carried out for the predetermined period of time or the predetermined number of times.

* * * * *